July 15, 1941. H. O. ANDERSON Re. 21,852

FLEXIBLE COATED ABRASIVE PRODUCT

Original Filed Aug. 15, 1936

Inventor

HARRY O. ANDERSON

By George Crom Pfrang Jr.

Attorney

Reissued July 15, 1941

Re. 21,852

UNITED STATES PATENT OFFICE 21,852

FLEXIBLE COATED ABRASIVE PRODUCT

Harry O. Anderson, Worcester, Mass., assignor to Norton Company, Worcester, Mass., a corporation of Massachusetts Original No. 2,123,581, dated July 12, 1938, Serial No. 96,205, August 15, 1936. Application for reissue May 11, 1939, Serial No. 273,149

4 Claims. (Cl. 51—185)

The invention relates to flexible coated abrasive products.

One object of the invention is to provide a coated abrasive which may be readily crumpled up and which is convenient to use. Another object of the invention is to provide a coated abrasive of open structure with fine grain. Another object of the invention is to provide a free-cutting coated abrasive product. Another object of the invention is to provide a coated abrasive for rubbing down articles having irregular surface contours. Another object of the invention is to provide a coated abrasive product particularly useful for furniture finishing and the like. Another object of the invention is to provide an open mesh abrasive cloth particularly useful for household purposes, such as the scouring of pans. Another object of the invention is to provide a coated abrasive product to do work now to some extent done by steel wool and articles known as "Chore boys." Another object of the invention is to provide a coated abrasive product susceptible of being used in the manufacture of grinding wheels, grinding discs and the like. Another object of the invention is to provide an abrasive cloth with abrasive grains in the cloth as well as on one surface thereof which can be made into solid abrasive articles by using a number of layers of the cloth and uniting them with suitable plastic material. Another object of the invention is to provide an intermediate product for use in the manufacture of abrasive products. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawing.

Figure 1:
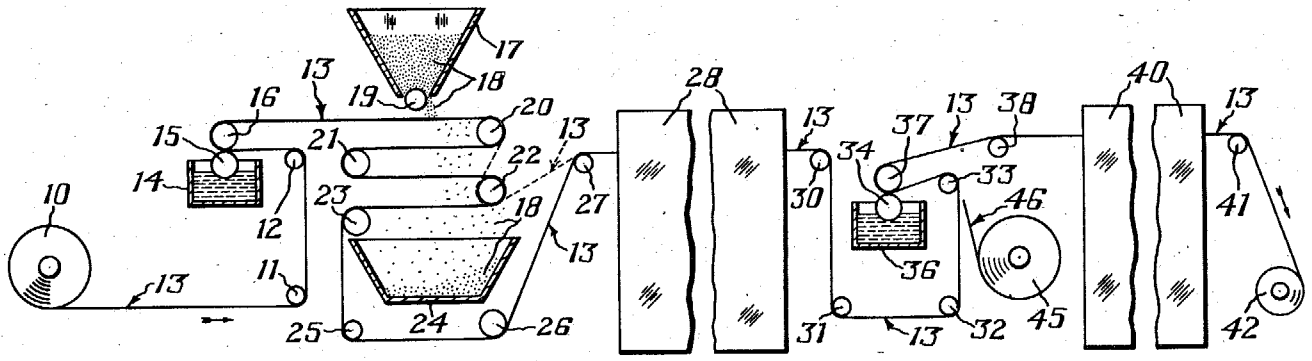
Figure 1 is a diagrammatic view showing one of many possible arrangements of apparatus for the manufacture of the flexible coated abrasive product of the invention.

Referring first to Figure 1, I provide a roll 10 of leno cloth. Leno cloth is woven cloth in which the warp is divided into pairs of ends and when the shed is changed, one end of each pair is moved over and across the other end of each pair. Thus, instead of the warp ends being one up and one down, alternately, as in a plain weave, they are in twisted relation to each other. Leno cloth is well understood and bolting cloth and similar fabrics as well as curtains are made therefrom. I prefer to use leno cloth made from cotton warp and weft. I prefer to use a plain leno cloth. The characteristic of leno cloth which is of particular importance so far as the present invention is concerned is that the weave produces an open mesh material and, furthermore, the open character of the weave is maintained during use of the material. In other words, there is much less tendency of the warp to run together and bunch, or of the weft to do the same, than in the case of a cheese cloth, for example. A cheese cloth is a cloth with the warp and weft spaced so as to make an open structure but made with a plain weave. So far as certain features of the invention are concerned, I might use a cheese cloth or any open mesh cloth whether made with a plain weave or not, but I prefer to use the leno cloth in some form. So far as certain features of the invention are concerned, it may be embodied in knitted goods but the tendency to stretch and to pull out of shape of such goods is such that I prefer to use woven goods embodied in leno cloth as aforesaid.

I provide apparatus which may include suitable supports or standards, not shown, supporting a plurality of rolls and a grain hopper, excess grain receivers and adhesive or bond containers, which supports or standards are not shown as the mounting of the various elements disclosed may be carried out in any suitable manner and is well understood in the coated abrasive art. Considering, therefore, the diagrammatic view of Figure 1, I provide a roller 11 and a roller 12 over which the sheet 13 of leno cloth is drawn. I provide further a receptacle 14 for a suitable adhesive, which may be heated if desired. A roller 15 extends below the level of the liquid in the container 14 and, therefore, coats the sheet 13 with the adhesive. Any known or desired adhesive may be used. For example, any one of the various glues may be employed or any one of the waterproof binders including those containing the drying, non-drying, and semi-drying oils, and also such binders as incorporate any one of the resins either natural or artificial. For example, shellac or a varnish may be used or, on the other hand, a synthetic resin product may be employed.

I further provide a pressure roller 16 around which the sheet 13 extends. By reason of the open structure of the leno sheet 13, it will be coated with adhesive not merely on one side but on both sides.

I provide an abrasive grain hopper 17. This may be filled with abrasive grain 18 of any desired type, for example fused alumina, otherwise known as aluminum oxide abrasive, emery, corundum, silicon carbide, garnet, quartz, sand, or even diamond bort. The abrasive grain 18 in the hopper 17 may be delivered by the roller 19 located in the bottom of the hopper.

I provide a roller 20, a roller 21, a roller 22, and a roller 23. I pass the sheet 13 first over the roller 20, then back over the roller 21, then over the roller 22, then back over the roller 23, as shown. I provide a receptacle 24 for surplus grain. I provide rollers 25 and 26 and lead the sheet 13 under these and then over a roller 27 and thence into a drying chamber 28. This drying chamber may take any usual or desired form and the sheet 13 may be disposed therein in festoons according to the usual practice.

Considering now the deposit of the abrasive grain 18, it lands on what I arbitrarily term the upper side of the sheet 13 of leno cloth and some of it adheres to the upper side of the warp or the weft thereof. Some also adheres to the sides of the warp and the weft of the leno cloth and is, therefore, located in the interstices of the fabric. Stating this in another way, there is a geometrical space between the one surface of the fabric and the other surface of the fabric which is of measurable proportions and some of the abrasive grain is between these planes.

Some of the grain, however, passes through the openings in the leno cloth and this lands on what I term the back side of the cloth after it has passed over the roll 20. The back side of the warp and weft is, therefore, coated with abrasive grain and some more attaches itself to the cloth in between the planes aforesaid and exists in the interstices of the cloth. However, some of the grain passes through the cloth a second time and this falls on the upper side of the cloth after it has passed around the roller 21. Such of the abrasive grain as passes through the cloth a third time lands on the back side thereof after the cloth has passed around the roller 22. By thus passing the abrasive grain through the cloth four times, it receives and retains as much thereof as can be held in place by the binder employed; the remainder falls into the receptacle 24.

After the cloth has passed through the drying chamber 28, the abrasive grain is stuck to it. It now passes over a roller 30, then down around a roller 31 and under a roller 32, then upwardly to a roller 33, and then in contact with a roller 34 which extends into liquid adhesive in a receptacle 36. This liquid adhesive may be what is commonly referred to as a sizing coat. The sheet 13 now goes around a pressure roller 37, over a roller 38 to a second drying chamber 40 where the material may also be festooned. Thence the sheet 13 goes over a roller 41 and to a take-up roll 42 of the finished product.

Considering now a modification of the invention, I may provide a roll 45 of paper the width of which is substantially the same as the width of the sheet 13. This is arranged in such a position that the sheet 46 of paper may pass over the roller 33 in contact with the sheet 13 and by reason of the sizing coat it will adhere to the sheet 13 and form a backing for the sheet 13. When using the roll 45 of paper, I prefer to thread the sheet 13 so that it shall not pass four times below the hopper 17 but rather pass over the roller 20, then under the roller 22, and then over the roller 27, as shown in dotted lines in Figure 1. Thus, according to this embodiment of the invention, only one side and the interstices of the sheet 13 is coated with abrasive grains. Any other expedient may be adopted for this purpose, for example the use of a suitable baffle or shield plate.

Figure 2:
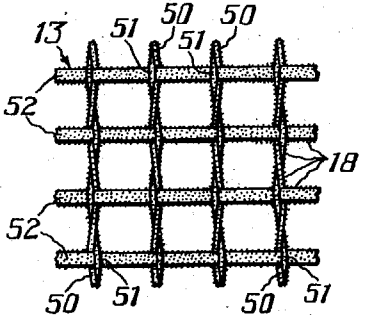
Figure 2 is a plan view of one embodiment of the product of the invention on an enlarged scale.
Figure 3:
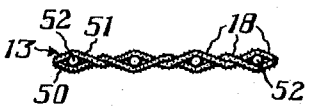
Figure 3 is a cross sectional view of the embodiment of Figure 2.

Considering now the product of the invention, Figures 2 and 3 disclose the embodiment where no backing sheet 46 is employed. The leno cloth consists of pairs 50 and 51 of warp ends twisted on each other at each pick together with a plurality of weft threads 52 passing between pairs of warp ends 50 and 51. Abrasive grain 18 is stuck to the warp and weft, as shown, and remains on both sides of each warp end, and on both sides of each weft thread or pick, and in the interstices between warp and weft, as shown in Figures 2 and 3. It will be observed that the individual abrasive granules are shown as smaller in diameter than the warp or the weft. Leno cloth is preferably made with warp of less diameter than the weft insomuch as there are two ends of warp twisted together and if the usual or preferred square arrangement as shown in Figure 2 is to be achieved, there will be twice as many warp ends as there are weft threads. Stating this in another manner, preferably the pick is one-half the sley, thus making the openings square, and in order that the actual weight of yarn in the warp and weft shall be the same, the count of the warp ends is twice that of the weft. I prefer that the abrasive grain shall be smaller in diameter than the diameter of the warp in order that good adhesion may be secured and in order to avoid a condition in which the abrasive grains too readily become detached from the fabric. For example, using 80's warp and 40's weft, I prefer to use abrasive grain as fine as 400 mesh size and I prefer to produce a fabric of the order of 20 picks per inch and of sley 40 ends to the inch. However, the invention has no limits in this respect; leno cloth of only 10 picks to the inch or even less may be employed if desired and, on the other hand, especially if very fine grain is used, for example 600 to 1000 grit size, leno cloth of 50 to 100 picks per inch or even finer may be employed.

Figure 4:
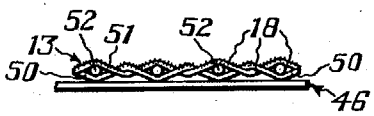
Figure 4 is a view similar to Figure 3, showing in longitudinal section a modification of the invention.

Considering now the embodiment of Figure 4, paper 46 of a thickness the same as or less than that of the sheet 13 will preferably be employed. Any type of paper may be used within the limits of the invention and, furthermore, for the sheet 46 of paper I may substitute cloth with a close weave. Cloth with a plain weave but with the warp and weft close together, or cloth with any fancy weave in which the warp and weft are close together, is quite distinct and different from leno cloth. Cotton cloth of such a nature cannot be seen through and, furthermore, abrasive grain will not pass into it or through it. Ordinary paper is also impervious to abrasive grain, as is well understood. Therefore, the embodiment of Figure 4, even where cloth is used, represents two distinct types of fabric with abrasive grain stuck to one of them and of such a nature that an open abrasive structure is produced, yet in which the individual granules are relatively fine. Such an abrasive structure has characteristics that are quite distinct and individual. It is free-cutting and at the same time cutting lines are exceedingly fine.

The product of Figure 2 and Figure 3 may be crumpled and used to polish or abrade any irregularly shaped article. It can be efficiently used for the scouring of pots and pans. Whereas a coated abrasive product such as is generally referred to as sandpaper resists being crushed into a ball and even then presents non-abrading portions and flat portions, the product of the invention can be rolled into almost any shape and is almost plastic. If a waterproof binder is used, it is especially useful for abrading articles under water or with water.

The article of Figure 4 has distinct characteristics. The paper 46 may, if desired, be waterproof paper so that the coated abrasive product of Figure 4 may be used under water or wet. It has an open, very free-cutting structure, and at the same time the abrasive grains are of small size. These characteristics produce a cutting action unlike that of any heretofore known product.

Whereas a cotton leno cloth has been specifically referred to, it should be understood that other yarns may be employed. Furthermore, the apparatus described is exemplary only and any other suitable apparatus or coating method may be employed. For example, the electrostatic method of coating now well known in actual practice may be used, if desired.

It will thus be seen that there has been provided by this invention an article in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. A coated abrasive product comprising warp and weft woven into an open mesh leno weave cloth, an adhesive, and a quantity of abrasive grain some of which is smaller in diameter than the diameter of the weft, the abrasive grain being stuck to the leno cloth by the adhesive on at least one surface of the leno cloth and some of the abrasive grain being stuck to the warp and weft and being between the surfaces of the leno cloth, substantially all of the grain projecting from the adhesive and being free from adhesive on its outside portions away from the warp and weft respectively.

2. A coated abrasive product comprising warp and weft woven into an open mesh leno cloth, an adhesive, and a quantity of abrasive grain some of which is smaller in diameter than the diameter of the weft, the abrasive grain being stuck to the leno cloth by the adhesive on both surfaces of the cloth and some of the abrasive grain being stuck to the warp and weft and being between the surfaces of the cloth, substantially all of the grain projecting from the adhesive and being free from adhesive on its outside portions away from the warp and weft respectively.

3. A coated abrasive product comprising warp and weft woven into an open mesh leno weave cloth, a quantity of abrasive grain some of which is smaller in diameter than the diameter of the weft, an adhesive securing such abrasive grain to the leno cloth, a backing impervious to the abrasive grain, and an adhesive securing the leno cloth to the backing, substantially all of the grain projecting from the adhesive and being free from adhesive on its outside portions away from the warp and weft respectively.

4. An abrasive article comprising open mesh leno cloth, finely divided abrasive material, and adhesive material impregnating the cloth and attaching the abrasive material thereto.

HARRY O. ANDERSON.